Patented Apr. 29, 1952

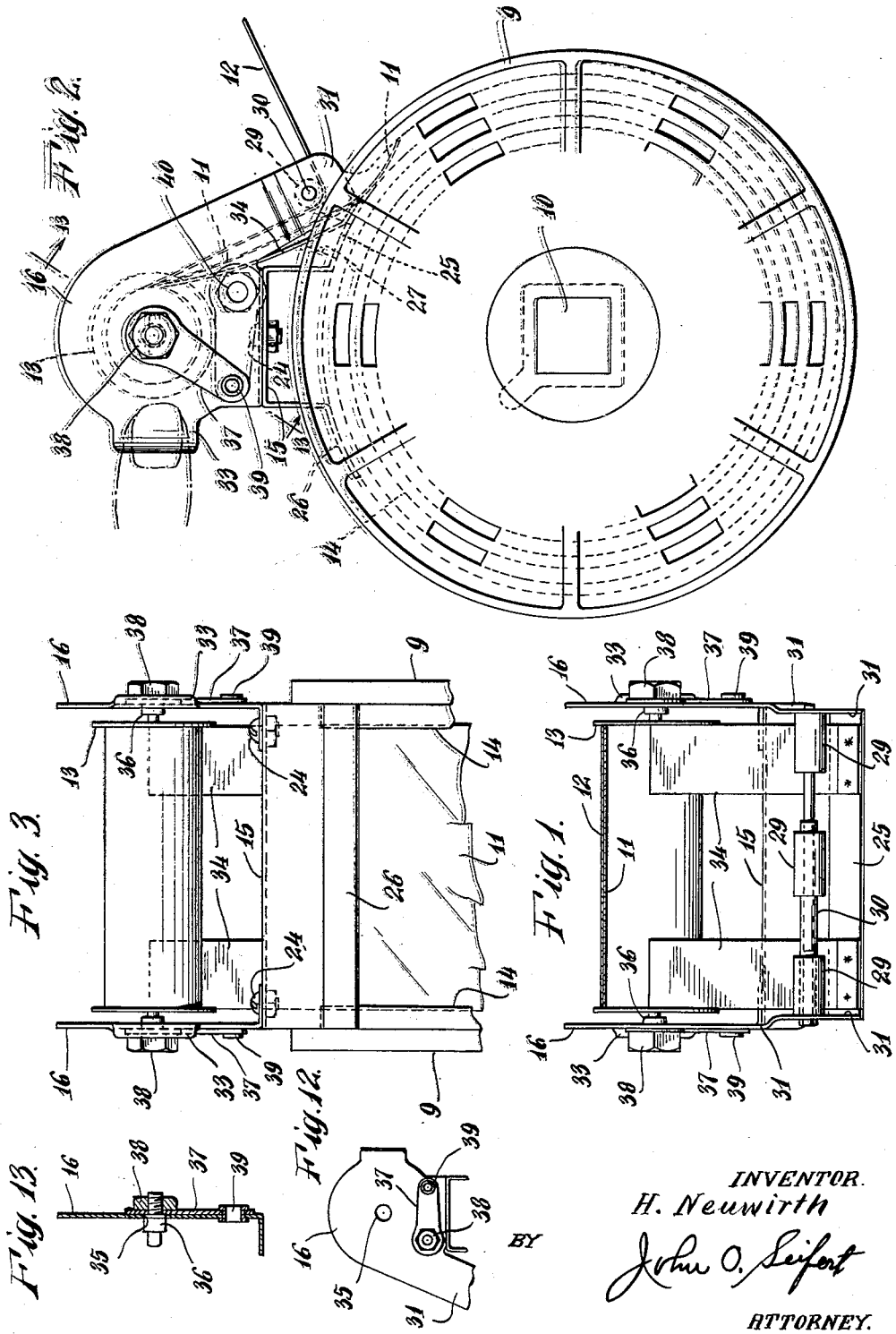

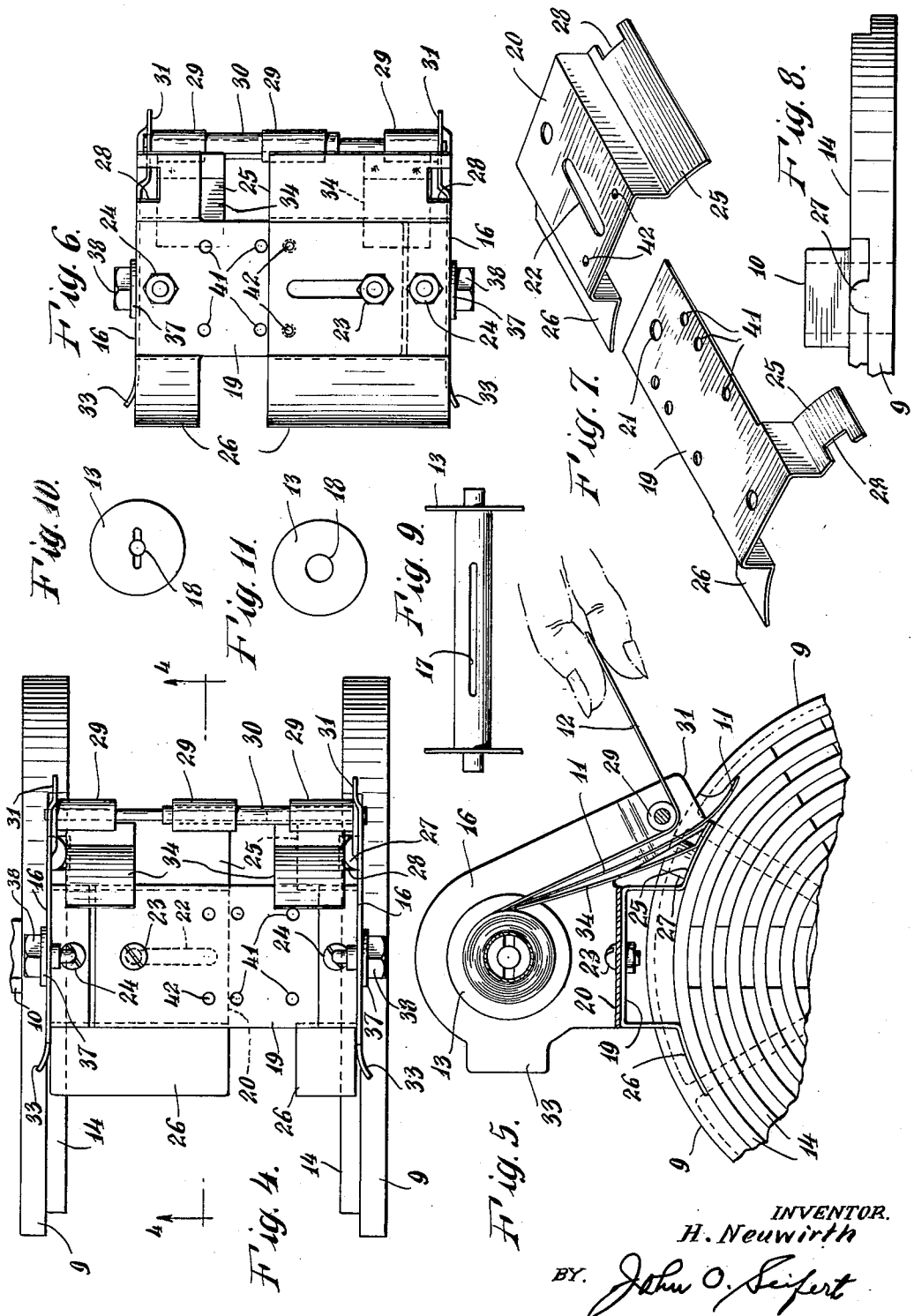

2,594,980

UNITED STATES PATENT OFFICE 2,594,980

MEANS FOR TRANSFERRING A FILM WEB FROM A ROLL TO A REEL OF FILM DEVELOPING MEANS

Herman Neuwirth, Brooklyn, N. Y.

Application March 5, 1947, Serial No. 732,582

5 Claims. (Cl. 242—55)

This invention relates to means for transferring a web of photographic film from a roll to a film web supporting reel of a film developing device preparatory to developing the exposures on the film web.

In reels for this purpose there is provided in the inner opposed faces of the reel heads like spiral grooves of opposite hand extending from adjacent the periphery of the reel heads to the axis thereof adapted for the engagement and supporting of a film web at the side marginal portions. To engage the film web in the grooves in the reel heads the side marginal portions at the end of the film web are entered into an end of the grooves either at the peripheral portion or at the axis of the reel heads and is effected by one hand while holding the roll of web film by the other hand and after the side marginal portions at the end of the film web are engaged in the grooves of the reel heads the film web as it is unwound from the roll is fed into and caused to follow the grooves by a pushing force applied to the web. This is not only a tedious operation since in unwinding the film web from the roll it is also necessary to unwind simultaneously from the roll a web of film separating and protecting material juxtaposed to the film web with the result that there is a possibility of scratching or otherwise marring the exposures on the film web.

It is the object of the invention to provide means to transfer a photographic film web as it is unwound with a web of protecting material from a roll or spool to the grooves in the reel heads arranged to support a spool having wound thereon a roll of juxtaposed webs of film and film protecting material, and the webs adapted to be simultaneously unwound from the spool while rotatably supported in said means, and said means arranged with guides relative to which the webs move as they are unwound from the spool and cause the film web to separate from the film protecting web and direct the film web between and cause the side marginal portions at the leading end thereof to engage in and follow the grooves in the reel heads by the unwinding of the film web from the spool, and to provide means for said purpose which is simple in construction and efficient in use and adjustable to adapt the same for the transferring of film webs of different widths into supporting engagement in the grooves of the reel heads.

In the drawings accompanying and forming a part of this application, Figure 1 is a front elevation of the means for transferring a photographic film web to a reel with the side marginal portions in supporting engagement in grooves in the faces of the reel heads and showing a spool carrying a roll of film web rotatably supported thereby.

Figure 2 is a side elevation of the film web transferring means shown in Figure 1 and showing the same held in engagement with a peripheral portion of the heads of the film web supporting reel and the guiding of the film web from the spool with the side marginal portions thereof into engagement with and following the grooves in the reel heads by the unwinding of the film web from the spool.

Figure 3 is a view looking at the left of Figure 2 with the major portion of the reel heads broken away.

Figure 4 is a plan view of adjustable film web transferring means adapting the same for transferring of film webs of different widths and showing the guiding of the film web to engage the side marginal portions thereof into supporting engagement in the grooves in the reel heads while holding the film web transferring means to the reel heads in operative position for transferring the film web from a spool into the grooves in the reel heads.

Figure 5 is a sectional view taken on the line 4—4 of Figure 4 showing the film transferring means in engagement with the reel heads, only a portion of one of which heads is shown, and the manner of guiding the leading end of the film web as it is unwound from the spool to cause the side marginal portions of the film web to engage in and follow the grooves in the reel heads.

Figure 6 is a view looking at the bottom of the film web transferring means shown in Figure 4.

Figure 7 is a perspective view showing the sections of the base member of the film web transferring means shown in Figure 4 in separated relation and arranged to be adjustably connected to adapt said means for the transferring of film webs of different widths.

Figure 8 is a view looking at a peripheral portion of a reel head to show the arrangement of a projection extending laterally from a face of the reel heads in spaced relation to the entrance to the outer convolution of the spiral grooves in the reel heads.

Figure 9 is a side elevation of a form of film web carrying spool adapted to be rotatably supported by the bracket.

Figures 10 and 11 are views looking at an end of spools showing different arrangements of sockets therein for the rotatable engagement of pintles or bearing members arranged on the bracket for rotatably supporting spools with such form of sockets in the end of the axle thereof.

Figure 12 is a view looking at the side of a spool support of the bracket and showing in full lines a carrier for a pintle or bearing member pivotally mounted thereon and showing the same in dotted lines adjusted to position with the pintle or bearing member out of spool supporting position; and Figure 13 is a sectional view taken on the lines 13—13 of Figure 2.

The invention is particularly adapted for the transferring of a roll of photographic film web having a web of film protecting material juxtaposed thereto from a spool to a film web supporting reel adapted to be rotatably supported in the receptacle of a film developing means preparatory to developing the film. The film web is supported by the reel by the engagement of the side marginal portions of the film web in like spiral grooves of opposite hand in the inner opposed faces of the reel heads and extending from adjacent the periphery to the axis of the heads 9 of the reel formed by a spiral rib 14 projecting from said face of the reel heads. The heads have a rectangular axial hub portion whereby they are mounted on an axle member 10 of corresponding cross section, one head being fixed adjacent an end of the axle member and the other head slidably adjustable thereon to adapt the reel for the supporting of film webs of different widths.

The means for transferring a web of film 11 from a roll of such web and a juxtaposed web of film of protecting material 12, such as paper, wound on a spool 13, to the supporting reel for the film web with the side marginal portions of the film web in supporting engagement in the spiral grooves in the reel heads, comprises a frame or bracket including a base portion 15 which may be of one piece when film webs of predetermined width are to be transferred successively to the reel, as shown in Figure 1, and said base portion having members 16 extending in parallel relation at a right angle from the opposite ends of the base portion and adapted to rotatably support a film web carrying spool 13.

Carrying spools for different film webs are of different structure whereby to rotatably support the spool. In the structure of a spool shown in Figure 9 the spool heads are fixed on axles with portions of the ends of the axle projecting from the spool heads adapted to engage in openings in the members 16, the webs being attached to the spool by engaging the end portion thereof in a slot 17 in the spool axle between the heads. In other forms of spools the heads are mounted on the axle of the spool with the outer surface of the heads flush with the ends of the axle and the axles have openings or sockets in the opposite ends of different form, as shown at 18 in Figures 10 and 11, for the rotatable engagement of pintles or bearing members carried on the members 16. To rotatably support in the members 16 spools of the type shown in Figure 9 said members 16 are provided with an opening 35 with the openings in alinement and in which openings the projecting ends of the axle of the spool are loosely engaged to rotatably support the spools in said openings. To arrange the members 16 with pintle or bearing members to engage in the sockets in the ends of the spool axle, as shown in Figures 10 and 11, the pintle or bearing members 36 are provided, said bearing members having two diameters with the portion of smaller diameter at the free end of said bearing members and are adapted to be removably engaged and supported in the openings 35 in the members 16 and positioned out of engagement with said openings to permit of the supporting therein of the type of spool shown in Figure 9. For this purpose the bearing members 36 are secured at the end of larger diameter in abutting relation to carriers therefor, and shown as comprising plates of resilient material 37, by engaging a screw threaded portion of reduced diameter projecting axially from the portion of larger diameter of the bearing member in an opening adjacent one end of the plates and a nut threaded thereon, as at 38, with the bearing member projecting from one side of the plate. The plates 37 are pivotally mounted opposite the end carrying the bearing member on the portion 16, as at 39, with the bearing member disposed between the members 16 and the bearing carrying plate 37 and said bearing carriers yieldingly urging the bearings toward the members 16. By the pivotal mounting of the bearing members they may be adjusted to position with the bearings engaging in the openings 35 in the members 16 and retained therein by the force of the resiliency of the carrying plates 37 as shown in the drawings with the portion of smaller diameter of the bearings members engaging in sockets in the ends of the spool axle of the form shown in Figure 10 and rotatably support the spool. To rotatably support a spool as of Figure 9 in the openings in members 16, the bearing carrying plates 37 are flexed outwardly from said members 16 and thereby moving the bearing members out of the openings therein when the plates 37 with the bearing members are moved on their pivotal connection to the dotted line position shown in Figure 2 and the bearing members engaged and retained in openings 40 in the members 16 by the resiliency of the bearing carrying plates 37.

To adapt the frame bracket to rotatably support spools 13 of different lengths and the transferring of film webs of different widths from a spool to the reel heads the base portion of the bracket is made of two longitudinally adjustable sections 19 and 20, as shown in Figures 4 to 7, with the spool supporting member 16 extending from the outer ends of the sections of the base portion. To releasably connect the sections 19, 20, one section, as 19, has an opening 21 therein adjacent the end opposite the end from which the member 16 extends, and the other section 20 has a longitudinal slot 22 therein. The inner end portions of the sections 19, 20 are adapted to be disposed in superposed relation and releasably secured together by a screw or bolt extended through the slot 22 and the opening 21 in section 19 and a nut threaded onto the projecting end, as shown at 23 in Figures 4 and 5, the nut preferably being a wing nut to facilitate screwing the nut onto and off from the bolt.

The base in the present instance is adapted to be adjusted to support film web carrying spools of three different lengths. For this purpose the base section 19 is arranged with three pairs of recesses or openings 41 predeterminedly spaced longitudinally of the section 19. The base section 20 is arranged with a pair of detents 42 shown as formed by offsetting the material to project from the under side thereof to be disposed in opposed relation to the upper surface of the section 19. To adjust the base sections the nut on the screw 23 is loosened and the sections adjusted relative to each other to cause the detents 42 on section 20 to engage in a desired pair of recesses or openings 41 in section 19, depending upon the length of the spool to be supported in the bracket, when the sections are locked together by screwing the nut onto the bolt 23.

While as shown the spool supporting members are constructed separate from the base portion and as having a right angle portion whereby they are secured to the base portion by bolts, as at 24, said spool supporting members 16 may be and preferably are constructed integral with the base portion and are formed by flanging or bending the outer end portions at a right angle to the base portion. The opposite side marginal portions of the base portion 15 inwardly from the outer ends, or the base sections 19, 20 inwardly from the outer ends thereof, are flanged to extend laterally or downwardly from the base portion opposite to the spool supporting members 16, and thence to extend outwardly, as at 25 and 26, with the outwardly extending portion of flange 25 extending forwardly and the outwardly extending portion of the flange 26 extending rearwardly of the spool supporting members 16 and said portions of the flanges arranged to arcuate form in longitudinal section to conform substantially to the outer convolution of the groove forming ribs 14 and adapted to be engaged with a portion of said ribs with the outwardly extending portion of the flange 25 predeterminedly spaced from the entrance to the outer convolution of the grooves in the real heads, as shown in Figures 2 and 5, by a projection 27 extending laterally from the face of the reel heads arranged with the grooves engaging a notch or recess 28 extending into the outer edge of the forwardly extending portion of the flange 25. In the sectional arrangement of the base portion of the bracket the flanges 25 and 26 are of narrow width relative to the length of the one base section, as 19, while said flanges of the other base section 20 extend for approximately the length of said section, and the laterally extending portion of the flanges of said section 20 when the base sections are connected together engage at the front and rear edges of the portion of the other base section 19 not arranged with the flanges.

Preparatory to unwinding a roll of photographic film 11 and a web 12 of film protecting material and separating juxtaposed convolutions of the film web wound on the spool, the frame bracket is adjusted so that the spool supporting members 16 will accommodate the desired length of spool, and the one head 9 of the reel is adjusted on the reel axle to adapt the reel for transferring thereto and supporting a film web of a width wound on a spool supported in the bracket. Preparatory to unwinding the webs from the spool the leading end of the web 12, a portion of which web usually projects beyond the end of the film web, is engaged below rollers 29 loosely mounted on a member 30 extending transversely between and fixed to guide members 31 for the side edges of the webs as they are unwound from the spool, which guide members are integral with and extend edgewise forwardly and diverge or incline downwardly from the spool supporting members 16 relative to and above the outer end portions of the forwardly extending portion of the flanges 25 of the base portion, and said member 30 with the rollers 29 spaced above said portions of the flanges 25. To adapt the roller carrying member 30 to be longitudinally adjustable with the bracket members and adapted the same for guiding webs 12 of different widths said member 30 is made of telescoping sections.

The frame bracket with a web carrying spool mounted therein is adapted to be held by the left hand by grasping portions 33 extended laterally from and flared outwardly from the spool supporting members 16 between the thumb and fingers and while so held positioned relative to the real heads with the outwardly extending portion of the flanges 25 and 26 engaging and held in engagement with the outer convolution of the groove forming ribs 14 of the reel heads adjacent the periphery of the reel heads and with the notches 28 in the flange 25 engaging the reel projections 27 and positioning the outwardly extending portion of the flange 25 in spaced relation to the entrance to the outer convolution of the grooves in the reel heads, as shown in Figure 5. In this position of the frame bracket with the outwardly extending portion of the flange 25 engaging the reel head projections 27 the forward or leading end of the web 12 is engaged below the rollers 29 preparatory to unwinding the webs from the spool and transferring the film 11 to the reel heads and the webs unwound from the spool by a pulling force applied to the web 12 in a slightly upward direction relative to the rollers 29, as shown in Figures 2 and 5. As the leading end of the film web 11 approaches the rollers 29, and due to the bend of the web 12 as it passes around said rollers, the webs are caused to separate from each other, the film web 11 tending to curl inwardly upon itself as it separates from the web 12 and thereby causing the leading end thereof to engage guide members 34, in the form of plates of resilient material juxtaposed and secured at one end portion to the top of the forwardly extending portion of the flange 25 of the bracket frame, as by welding, and said resilient guide members extending rearwardly and inclining upwardly with a side edge adjacent the guide members extending forwardly and inclining downward from the spool supporting members 16 to and with the free ends yieldingly engaging upon the web 12 wound on the spool. As the end of the film web 11 engages the guide members 34 the leading end of said film web 11 is directed to the space between the forwardly extending portion of the bracket flanges 25 and the entrance to the outer convolutions of the spiral grooves in the face of the reel heads and directing the film web between the reel heads and causing the side marginal portions at the leading end of the film web to engage in and follow said grooves by the unwinding of the film web from the spool.

To cause the side marginal portions at the leading end of the film web to engage in and follow the grooves in the reel heads at the axis of the reel heads the reel heads are spaced apart a distance substantially equal to the width of the film web. The leading end of the film web is connected to the hub of the reel heads by a band of flexible material attached at one end to the end of the film web and connected at the opposite end to a projection extending laterally from the hub of the reel heads, shown in Figure 2. As the film web is unwound from the spool it is directed between the reel heads and as the film web is of slightly greater width than the space between the grove forming ribs 14 of the reel heads the film web is caused to buckle longitudinally and as the leading end approaches the entrance to the grooves in the reel heads adjacent the axle it will assume a flat condition and cause the side marginal portions at the leading end of the film web to engage in the entrance to and follow the grooves in the reel heads as the film web is unwound from the spool.

Having described my invention, I claim:

1. In means for transferring a photographic film web from a spool to a developing reel, a bracket including a base portion having end members arranged to rotatably support a spool of photographic film web and the front and rear sections of the base portions flanged to extend in a direction opposite to the direction in which the end members extend and adapted to support the bracket on the reel, guide portions extending from the end members towards the front flanged section, resilient members supported by the front flanged section of the base portion and extended between the guide portions and end members to engage the under-surface of the film web on the spool, and a member extending transversely between and supported by the guide portions and spaced above the resilient members, whereby the film web is unwound from the spool to the reel between the resilient members and the transverse member.

2. Means for transferring a photographic film web from a spool to a developing reel as claimed in claim 1, wherein the end members are arranged with aligned openings, plates of resilient material each pivotally mounted at one end on the outer sides of an end member, a bearing member fixed to the opposite end of each of said resilient plates and adapted by the pivotal movement of the plates to engage in the aligned openings in the end members.

3. In a device of the class described, the combination of a base member, end members projecting upwardly from said base member adjacent opposite ends thereof, a protuberance carried by each of said end members and extending inwardly therefrom each toward the other, at least one of said end members being flexible and movable with its protuberance away from the other to facilitate inserting a film spool from an open side edge of said end members onto said protuberances, a resilient film guide apron having a free edge for pressing against a film spool terminating in proximity to a protuberance and secured adjacent an opposite edge thereof to said base member at a location adjacent a side edge of an end member, and a guide bar extending between and having opposite ends thereof secured to said end members adjacent said secured edge of the guide apron and spaced from the guide apron.

4. A film threading device comprising the combination of a base member for resting against and spanning the distance between side flanges of a developing reel, end members projecting upwardly from said base member adjacent opposite ends thereof each having open side and top edges an inwardly extending protuberance carried by each of said end members, a resilient film guide apron secured adjacent a bottom edge thereof to said base member at a location opposite an open side edge of an end member, said apron projecting upwardly between said end members and having a free edge terminating in proximity to a common axis of said protuberances and swingable about its bottom edge toward said axis for pressing against a film spool, at least one of said end members being flexible and movable with its protuberance away from the other end member to facilitate inserting a film spool from one open side edge of the end members onto said protuberances in opposition to the effect of said film guide apron.

5. In a device of the class described, the combination of a base member, end members projecting upwardly from said base member adjacent opposite ends thereof, a protuberance carried by each of said end members and extending inwardly therefrom each toward the other, at least one of said protuberances being resiliently carried by its end member and movable away from the other protuberance and its end member to facilitate inserting a film spool from an open side edge of said end members onto said protuberances, a resilient film guide apron having a free edge for pressing against a film spool terminating in proximity to a protuberance and secured adjacent an opposite edge thereof to said base member at a location adjacent a side edge of an end member, and a guide bar extending between and having opposite ends thereof secured to said end members adjacent said secured edge of the guide apron and spaced from the guide apron.

HERMAN NEUWIRTH.

REFERENCES CITED

The following references are of record in the file of this patent:

UNITED STATES PATENTS

| Number | Name | Date |
|---|---|---|
| 2,276,297 | Flood | Mar. 17, 1942 |

FOREIGN PATENTS

| Number | Country | Date |
|---|---|---|
| 605,273 | Germany | Nov. 19, 1932 |